(12) United States Patent
Tajima et al.

(10) Patent No.: US 6,741,766 B2
(45) Date of Patent: May 25, 2004

(54) OPTICAL SWITCH DEVICE

(75) Inventors: Kazuyuki Tajima, Kawasaki (JP); Haruo Yamashita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 311 days.

(21) Appl. No.: 10/079,902

(22) Filed: Feb. 22, 2002

(65) Prior Publication Data

US 2003/0016904 A1 Jan. 23, 2003

(30) Foreign Application Priority Data

Jul. 18, 2001 (JP) .......................... 2001-218570

(51) Int. Cl.[7] ................................................ G02B 6/26
(52) U.S. Cl. ........................................ 385/16; 385/100
(58) Field of Search ..................... 385/16–24, 124–128; 398/130, 42, 100, 108; 370/60, 94, 244, 385–405; 326/37–41

(56) References Cited

U.S. PATENT DOCUMENTS 6,301,247 B1 * 10/2001 Larson et al. ............... 370/387
6,360,036 B1 * 3/2002 Couillard ...................... 385/19
6,650,142 B1 * 11/2003 Agrawal et al. .............. 326/41
2002/0097478 A1 * 7/2002 Behin et al. ................ 359/290
2002/0181067 A1 * 12/2002 Romanovsky et al. ...... 359/245

FOREIGN PATENT DOCUMENTS

JP          6-332019         12/1994

* cited by examiner

*Primary Examiner*—Akm Enayet Ullah
(74) *Attorney, Agent, or Firm*—Staas & Halsey LLP

(57) ABSTRACT

An optical switch device improving a yield and compact and excellent in expandability of optical incoming/outgoing ports, comprised of: a plurality of planar switch modules arranged in the horizontal direction and stacked in the vertical direction; and a coupler switch module, arranged in the vertical direction along each one side of the planar switch module, for selectively coupling the plurality of optical paths formed on one planar switch module and a plurality of optical paths formed on another planar switch module.

10 Claims, 17 Drawing Sheets

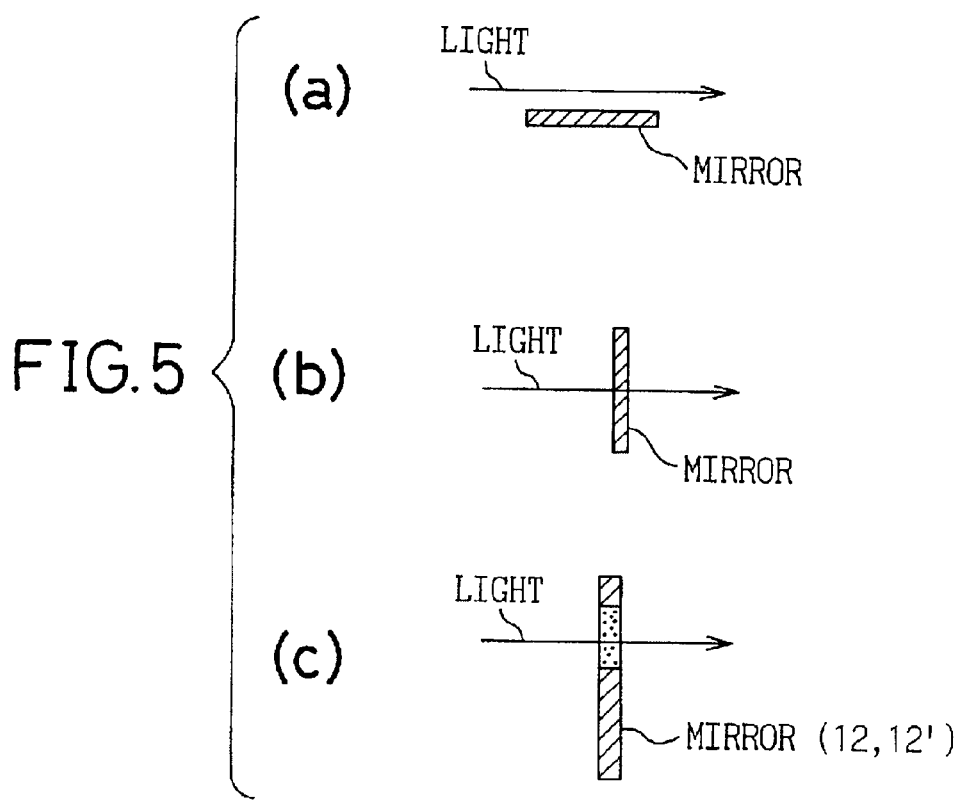

OPTICAL SWITCH DEVICE

BACKGROUND OF THE INVENTION

1. Field of the Invention

The present invention relates to an optical switch device.

In recent years, large volume optical communications have rapidly spread. Therefore, optical cross-connect devices enabling control of path alteration of an optical route by making good use of for example wavelength division multiplexing (WDM) technique are now becoming more important.

The present invention relates to an optical switch device preferable for mounting in for example an optical cross-connect device described above.

2. Description of the Related Art

As will be explained in detail later by referring to the drawings, the optical switch device to which the present invention relates is comprised of at least a substrate, an optical incoming port and optical outgoing port provided on the substrate, and a micro mirror placed between these optical incoming port and optical outgoing port.

For example, in the configuration shown in FIG. 18 (mentioned later), if it is intended to realize an optical switch device of 1000×1000 (N×M), it is necessary to form and arrange about 1,000,000 micro mirrors on the surface of the substrate. In this case, naturally it is necessary to arrange 1,000 optical incoming ports on the incoming side and arrange 1,000 optical outgoing ports on the outgoing side, so a fairly large sized mounting space must be provided on the substrate.

Even if there is one defective micro mirror on the large sized substrate, the entire substrate must be discarded. As described above, when forming 1,000,000 micro mirrors, there is a problem of the higher possibility of defects of the micro mirrors and therefore an extremely reduced yield of the optical switch device.

SUMMARY OF THE INVENTION

An object of the present invention is to provide an optical switch device capable of improving the yield.

The present invention makes it possible to realize a further economical optical switch device by this. Further, it also has the effect that a more compact device can be achieved and the effect that an optical switch excellent in expandability of optical incoming/outgoing ports can be realized.

To attain the above object, according to the present invention, there is provided an optical switch device comprised of: a plurality of planar switch modules arranged in a first direction and stacked in a second direction; and a coupler switch module, arranged in the second direction along each one side of the planar switch module, for selectively coupling the plurality of optical paths formed on one planar switch module and a plurality of optical paths formed on another planar switch module. By this, an optical switch device improved in yield and compact and excellent in the expandability of the optical incoming/outgoing ports is realized.

BRIEF DESCRIPTION OF THE DRAWINGS

The above object and features of the present invention will be more apparent from the following description of the preferred embodiments given with reference to the accompanying drawings, wherein:

FIG. 4 is a view schematically showing a micro mirror serving as an optical transmitting/reflecting element;

FIG. 5 is a view of aspects (a), (b), and (c) of transmission of light at the micro mirror;

DESCRIPTION OF THE PREFERRED EMBODIMENTS

Before describing the embodiments of the present invention, the related art and the disadvantages therein will be described with reference to the related figures.

Figure 17:
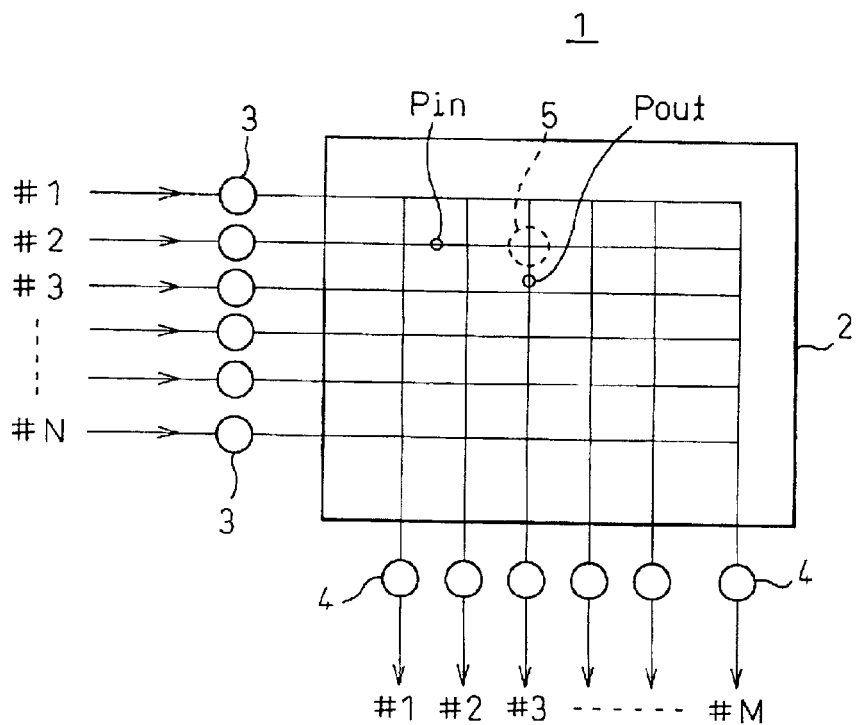
FIG. 17 is a view of the general configuration of an optical switch device.

FIG. 17 is a view of the general configuration of an optical switch device.

In the figure, reference numeral 1 indicates the optical switch device.

The device 1 is mainly comprised of a substrate 2 and a plurality of optical elements 5 arranged on the substrate 2 in the form of a matrix.

For example, optical signals input from channels #1 to #N enter from corresponding optical incoming ports 3 into the device 1. On the other hand, for example, the optical signals are output from the device 1 via optical outgoing ports 4 corresponding to the channels #1 to #M. Due to this, an N×M optical switch device 1 is comprised as a whole.

To which optical outgoing port 4 the optical signal from which optical incoming port 3 is led is determined according to the status of the optical element 5. Now, as one example, if the optical element 5 illustrated by the dotted line turns on, the optical signal is reflected at the optical element 5, and the incoming side optical signal #2 is switched to the outgoing side optical signal #3 through the illustrated incoming side optical path Pin and outgoing side optical path Pout.

Along with advances in the above-mentioned wavelength division multiplexing (WDM) technique, the number of wavelengths carried by one fiber (corresponding to each of 3#1 to 3#N and 4#1 to 4#M of FIG. 17) reaches as high as 100. Therefore, even if the dozens of fibers are introduced to one device 1, an optical switch function of about the 1000×1000 scale becomes necessary, so the optical switch device 1 becomes considerably large.

As a well known optical element 5 suitable for mounting at crosspoints on the substrate 2 of such a large optical switch device 1, there is for example a liquid crystal hologram. However, as an optical element 5 more suitable than this, an optical transmitting/reflecting element can be mentioned. As a practical concrete example of that optical transmitting/reflecting element, there is an optical transmitting/reflecting element of the micro electronic mechanical system (MEMS) serving as a micro machine.

The present invention will mainly be explained with reference to the case where optical transmitting/reflecting elements, particularly MEMS optical transmitting/reflecting elements, are used as the optical elements 5 of FIG. 17.

Figure 18:
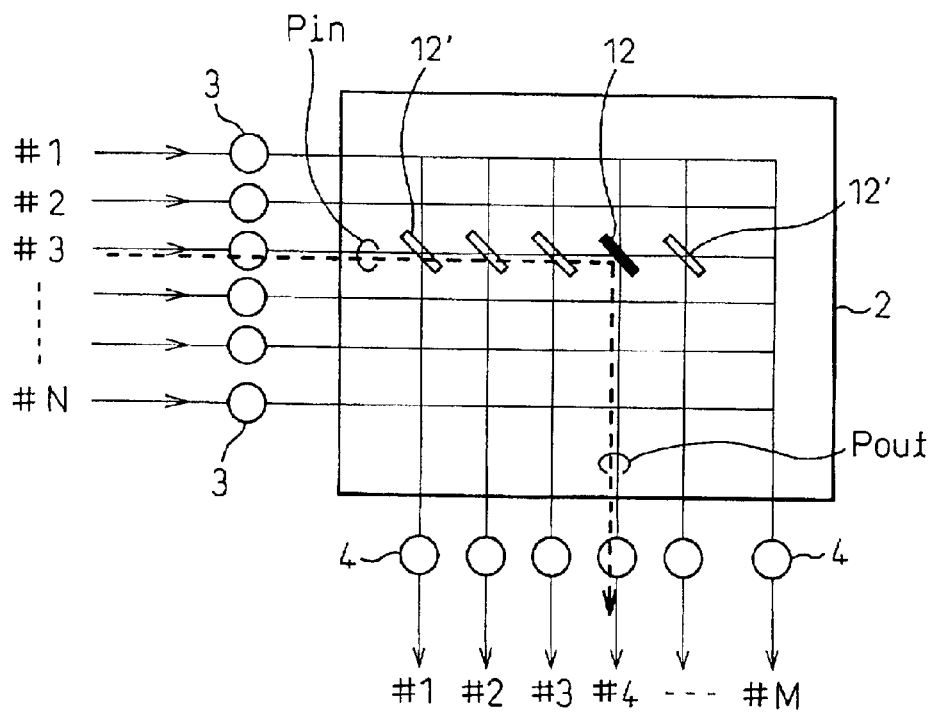
FIG. 18 is a view of an optical switch device using an optical transmitting/reflecting element of the micro electronic mechanical system.

FIG. 18 is a view of an optical switch device using MEMS optical transmitting/reflecting elements.

The optical switch device 10 of the figure uses MEMS optical transmitting/reflecting elements 12 (12') as the optical elements 5 of FIG. 17. Note that the meanings of 3#1 to 3#N, 4#1 to 4#M, Pin, Pout, etc. are as explained above.

According to the MEMS technique, a large number of micro mirrors can be formed on a silicon substrate 2. Due to this, an extremely large capacity spatial optical switch device can be realized. The micro mirrors are optical transmitting/reflecting elements 12 (12').

The elements 12' are in a state passing the optical path Pin (off), that is, a state where the micro mirrors are not standing up (are lying down).

On the other hand, the element 12 is in a state switching the optical path Pin (reflecting the optical signal) (on), that is, a state where the micro mirror is standing up.

Thus, the optical signal from the optical incoming port 3 of the channel #3 is reflected at the optical transmitting/reflecting element 12 and switched to the optical outgoing port 4 of the channel #4. By this, for example, the function of the optical cross-connect device is achieved.

As mentioned above, if it is intended to realize a 1000× 1000 (N×M) optical switch device by the configuration shown in FIG. 18, it is necessary to form and arrange about 1,000,000 micro mirrors (12, 12') on the surface of the substrate 2. In this case, naturally it is necessary to arrange 1,000 optical incoming ports 3 on the incoming side and arrange 1,000 optical outgoing ports 4 on the outgoing side, so a fairly large sized mounting space must be provided on the substrate 2.

In this way, even if there is one defective micro mirror (12, 12') on the large sized substrate 2, the entire substrate must be discarded. As described above, if forming 1,000,000 micro mirrors, there is the above problem of a higher possibility of defects of the micro mirrors and therefore an extremely reduced yield of the optical switch device.

In consideration of this problem, the present invention provides an optical switch device capable of improving the yield.

The present invention makes it possible to realize a further economical optical switch device by this. Further, it has the effect that a more compact device can be achieved and the effect that an optical switch excellent in expandability of optical incoming/outgoing ports can be realized. These effects will become clearer by the later explanation.

Figure 1:
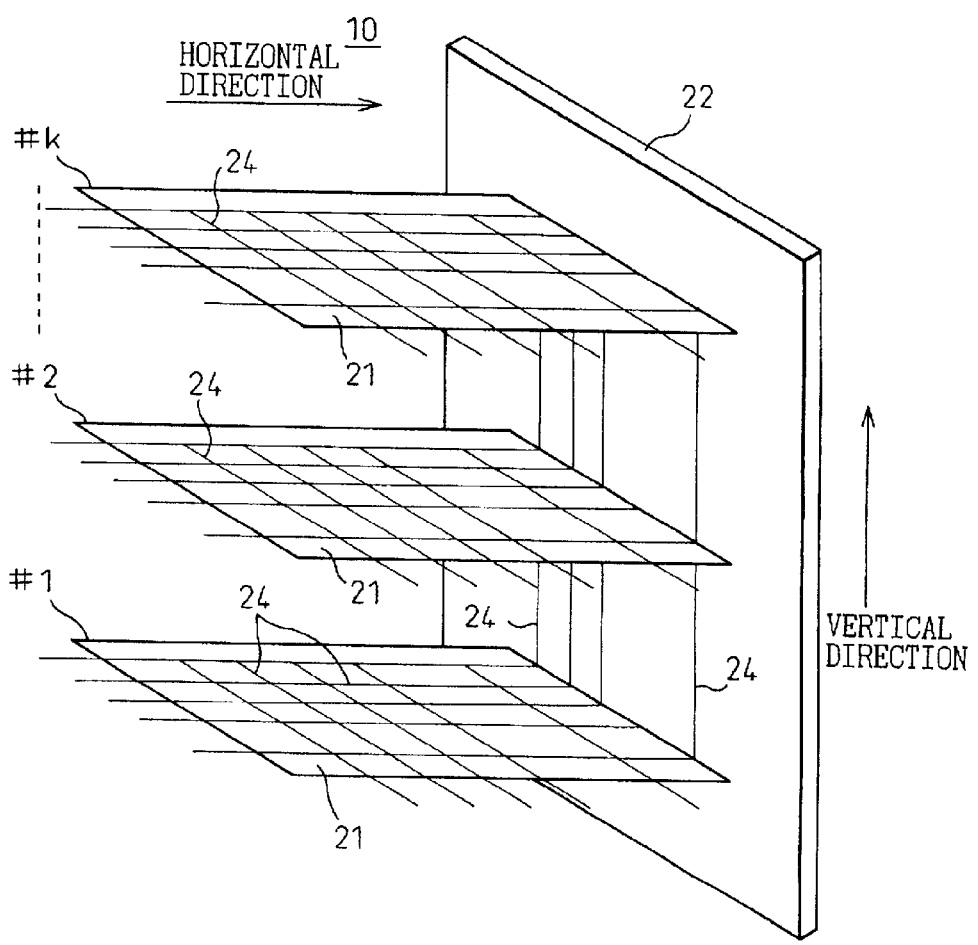
FIG. 1 is a view of the basic configuration of the present invention.

FIG. 1 is a view of the basic configuration of the present invention.

As shown in the figure, the optical switch device 10 according to the present invention has a plurality of planar switch modules 21 and at least one coupler switch module 22.

The plurality of planar switch modules 21 (#1 and #2 to #k) are arranged in the horizontal direction and stacked on each other in the vertical direction.

Also, the coupler switch module 22 is arranged in the vertical direction along each one side of the plurality of planar switch modules 21, and selectively couples a plurality of optical paths 24 formed on one planar switch module 21 with a plurality of optical paths 24 formed on another planar switch module 21.

By such a configuration, when there is a defective micro mirror, only the planar switch module 21 including this defective micro mirror need be discarded, so the yield of the optical switch device 10 as a whole is improved.

Also, the overall device is a three-dimensional structure, so a more compact device can be achieved.

Furthermore, optical incoming ports can be arranged everywhere on one side of the k number of planar switch modules. similarly the optical outgoing ports can be arranged everywhere on the other side, so an optical switch device excellent in incoming/outgoing expandability is realized.

Figure 2:
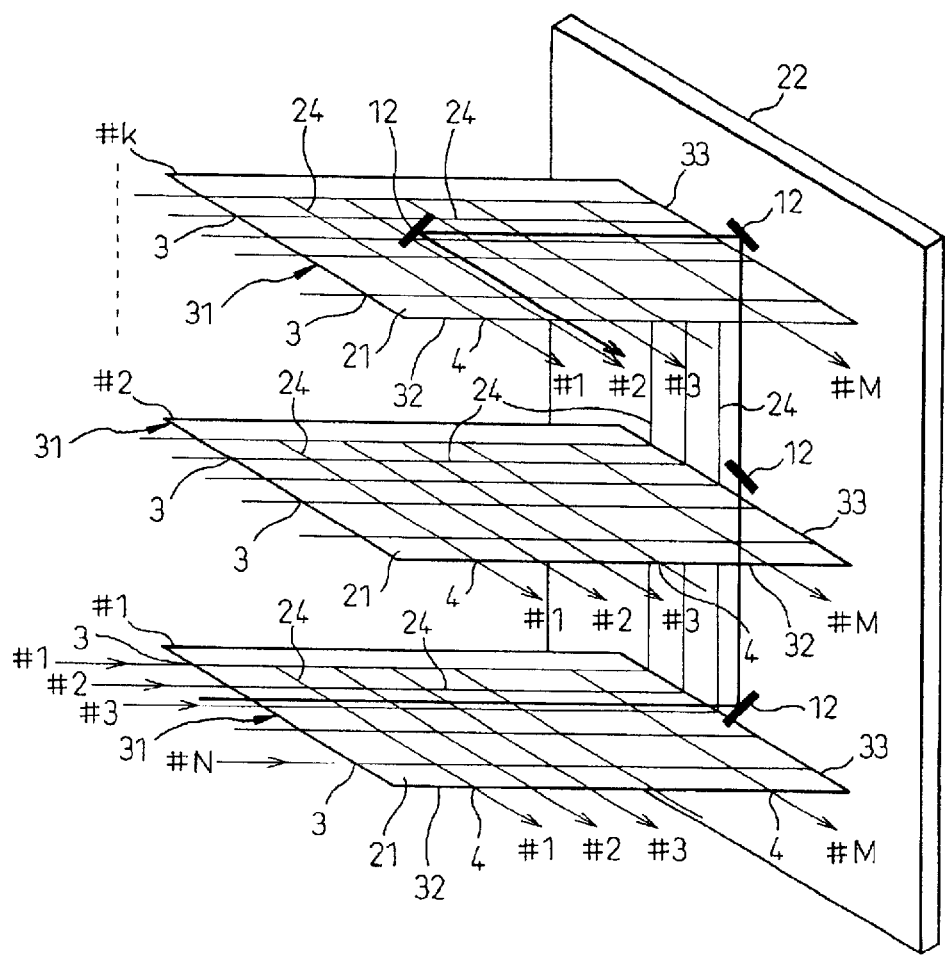
FIG. 2 is a view of a first embodiment of the present invention.

FIG. 2 is a view of a first embodiment of the present invention. Note that the same reference numerals or symbols are assigned to similar components throughout all the figures.

In the optical switch device 10 shown in FIG. 2, each planar switch module 21 is provided with a plurality of optical transmitting/reflecting elements 12 arrayed on its surface in the form of a matrix and capable of expanding routes of the optical paths 24 as they are or switching of the routes.

Also, the coupler switch module 22 is provided, on the surface thereof, with a plurality of optical transmitting/reflecting elements 12 for forming optical paths 24 for selectively coupling a plurality of optical paths 24 to each other among a plurality of planar switch modules.

More concretely, in the optical switch device 10 shown in FIG. 2, the plurality of planar switch modules 21 are comprised of k number of the planar switch modules (#1 to #k). Each planar switch module 21 has N number of optical incoming ports 3 at most receiving as input optical signals at the corresponding optical paths 24 so as to realize k×N number of incoming ports 3 at the maximum. Further, each planar switch module 21 has M number of optical outgoing ports 4 at most outputting the optical signals from the corresponding optical paths 24 so as to realize k×M number of optical outgoing ports 4 at the maximum.

Further, a plurality of optical incoming ports 3 are arrayed on first sides 31 of the plurality of planar switch modules 21, while a plurality of optical outgoing ports 4 are arrayed on second sides 32 perpendicular and adjoining to the first sides 31 of the plurality of planar switch modules 21. Here, the coupler switch modules 22 are arranged along third sides 33 forming opposite sides relative to the first sides 31.

This will be explained in further detail by referring to FIG. 2. The plurality of planar optical switch modules 21#1 to 21#k each comprising N×M number of optical switches are coupled by the planar coupler switch module (N×k number of optical switches) 22 for spatial coupling, so as to realize N×(M×k) number of optical switches with incoming N number of ports and outgoing M×k number of ports as a whole.

Here, in a planar optical switch module 21, when an optical signal is output from an optical outgoing port 4 in its plane, the optical route is altered at the crosspoint in the planar optical switch module 21. For example, in the figure, light from the optical incoming port 3 of the channel #2 can be output from the optical outgoing port 4#1 of the planar optical switch module 21#1 (the related route is not illustrated).

On the other hand, when an optical signal is output from the optical outgoing port 4#2 of another planar optical switch module, for example 21#k, the route is altered at the element 12 in the coupler switch module 22 (to the vertical direction in this case), and the optical signal is transferred to a switch plane of that planar optical switch module 21#k. In the example of the figure, a situation where the optical signal from the optical incoming port 3 of the channel #3 is output from the optical outgoing port 4#2 of the planar optical switch module 21#k is indicated by an arrow.

Figure 3:
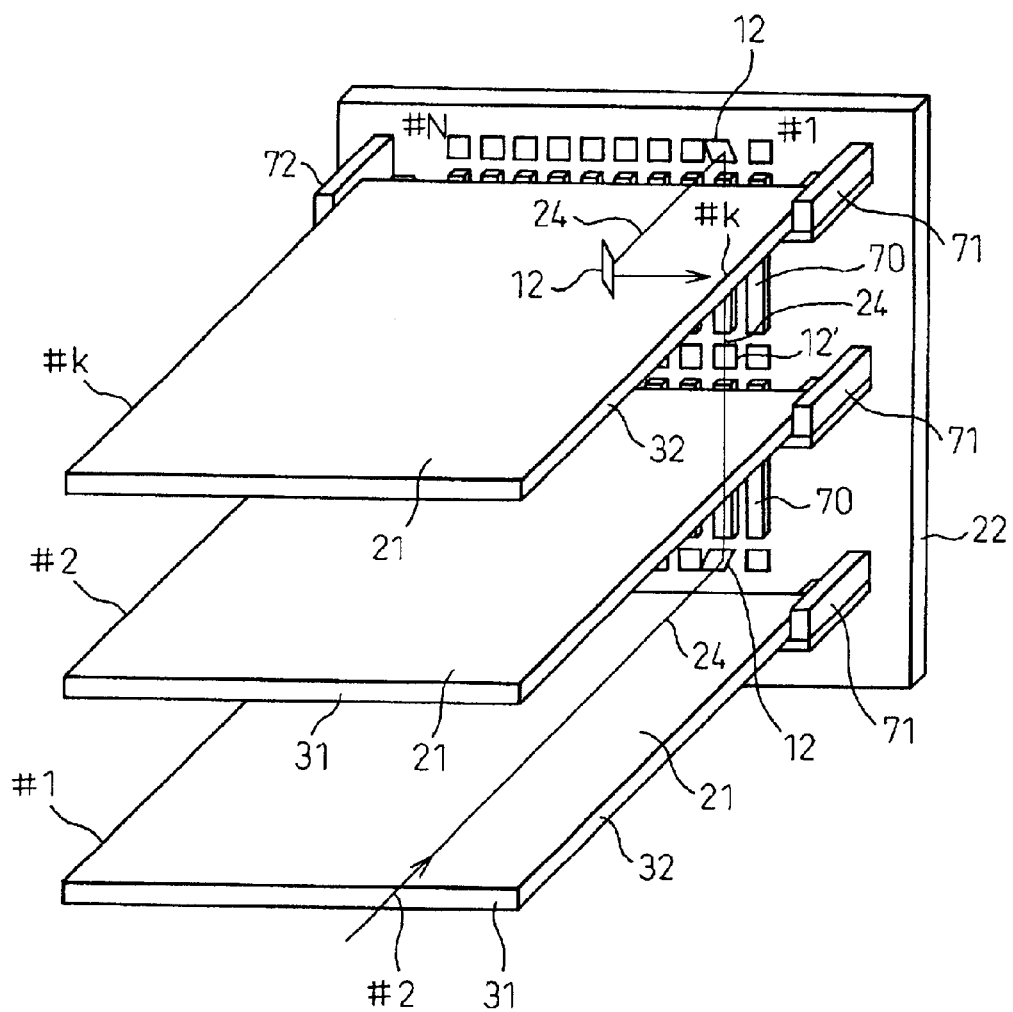
FIG. 3 is a view explaining the configuration of the first embodiment of FIG. 2 in further detail.

FIG. 3 is a view for explaining the configuration of the first embodiment of FIG. 2 in more detail. Note, the viewing angle is shifted by 90 degrees from FIG. 2, and the coupler module 22 is seen at the front.

In the figure, in the coupler switch module 22, N number of (#1 to #N) micro mirrors (optical transmitting/reflecting elements) 12 are aligned in the horizontal direction in the portion connected to the planar switch module 21. An optical path 24 realized by an optical waveguide 70 for example a PLC is formed between the micro mirror 12 and the micro mirror 12 adjoining this in the vertical direction.

Each of the planar switch modules 21 is fixed to the coupler switch module 22 by a support metal fitting 71 placed at an intersecting portion of the second side 32 and the third side 33 (and a support metal fitting 72 on the opposite side to this).

There is a fine gap between the third side 33 of each of the planar switch modules 21 and the coupler switch module 22. Due to the existence of this gap, when a micro mirror 12 rises by exactly 45 degrees, the micro mirror 12 can be prevented from hitting the planar switch modules 21.

Note that, in FIG. 3, the route of the light from the optical incoming port #2 of the planar switch module 21#1 to the optical outgoing port #k of the module 21#k is indicated by a bent arrow as an example.

FIG. 4 is a view schematically showing a micro mirror serving as an optical transmitting/reflecting element.

For conversion of the optical route, for example, total reflection by 45 degrees by the micro mirror as shown in FIG. 4 is utilized. By the arrangement of this micro mirror, a change of direction by 90 degrees in an identical plane or a change of direction by 90 degrees to the vertical direction is possible.

Note that, if the micro mirror is placed down, light passes through that position. The micro mirror 12 located at a connection portion of the planar switch module 21#2 and the coupler switch module 22 of FIG. 2 is a mirror for passing light. The transmission of light will be additionally explained.

FIG. 5 is a view of aspects (a), (b), and (c) of the transmission of light at a micro mirror.

(a) of the figure shows a mode wherein the mirror is lying down flat so as not to block the light, (b) of the figure shows a mode wherein the light is passed so that the light perpendicularly strikes the mirror, and (c) of the figure shows a mode wherein an area for passing the light is formed at part of the mirror and the mirror is moved so that the light strikes there to pass the light.

Viewing (b) and (c) of the figure, generally a mirror is realized by coating a reflective film (filter) on a light transmitting material (medium: glass etc.), so the aspects of (b) and (c) of the figure can be realized by designing the coated reflective film so as not to block the perpendicularly striking light.

Figure 6:
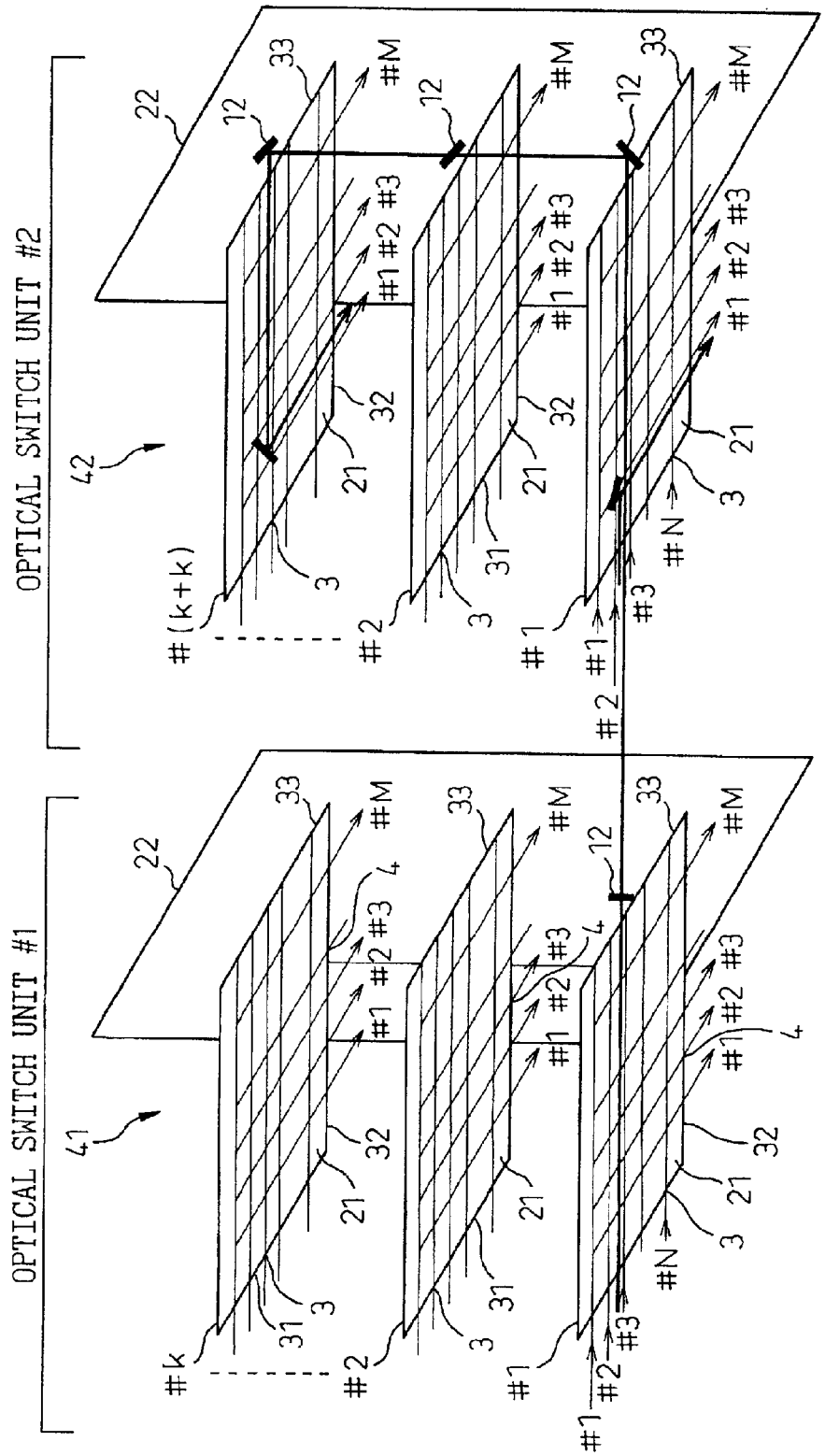
FIG. 6 is a view of a second embodiment of the present invention.
Figure 7:
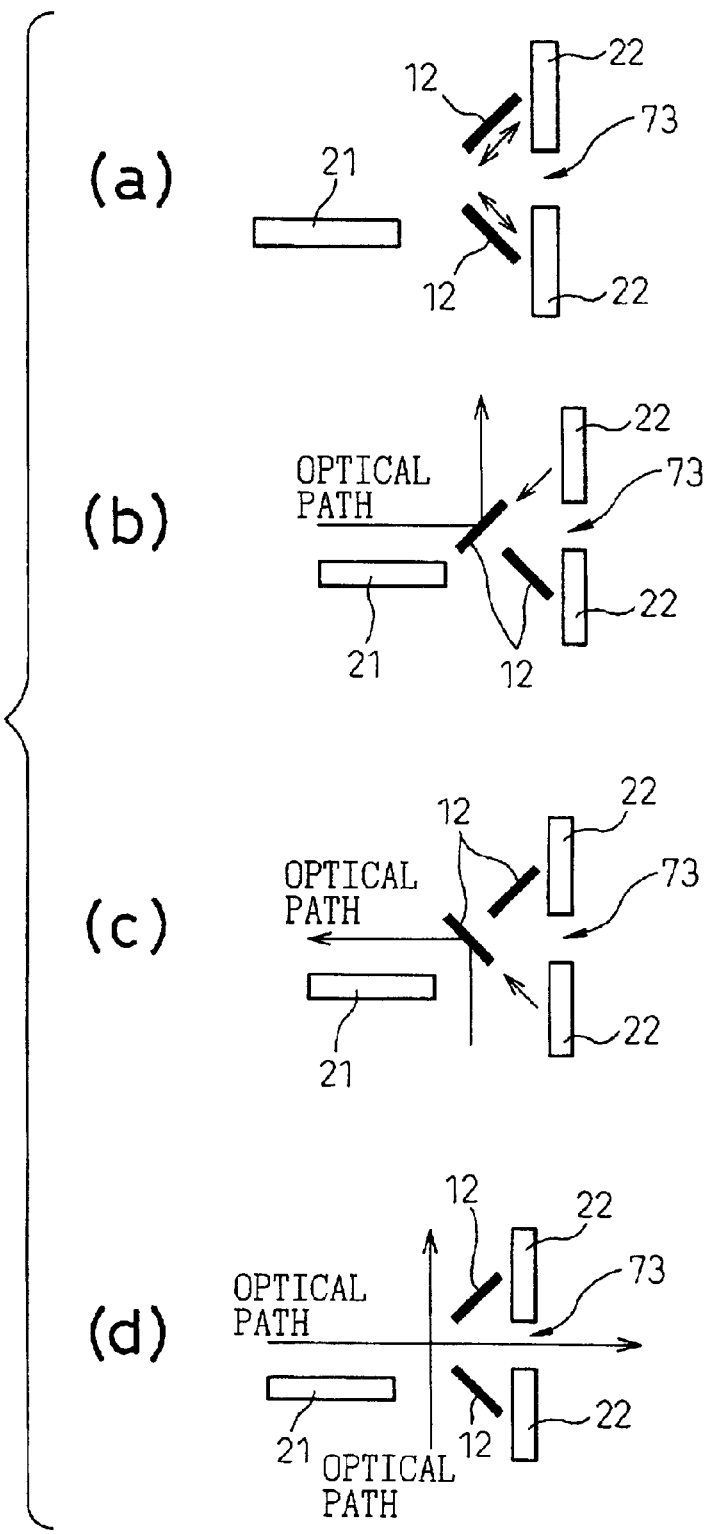
FIGS. 7(a) to 7(d) are views explaining the configuration of the second embodiment of FIG. 6 in more detail (part 1)

FIG. 6 is a view of a second embodiment of the present invention.

In this second embodiment, a plurality of optical incoming ports 3 are arrayed on first sides 31 of a plurality of planar switch modules 21, a plurality of optical outgoing ports 4 are arrayed on second sides 32 perpendicular and adjoining to the first sides 31 of the plurality of planar switch modules 21, a coupler switch module 22 is arranged along each third side 33 forming the opposite side of each first side 31, thereby comprising a first optical switch unit 41#1, and further a second optical switch unit 42 having the same configuration as the first optical switch unit 41 is connected in cascade with the first optical switch unit 41 in the horizontal direction by enabling each optical path to penetrate through the coupler switch module 41#1.

In the configuration of FIG. 6, two optical switch units 41 and 42 are connected as illustrated so as to expand the switch scale [N×(M×k)] of one optical switch unit to twice a switch scale [N×(M×k)×2].

FIGS. 7(a) to 7(d), 8, and 9 are views for explaining the configuration of the second embodiment shown in FIG. 6 in more detail.

FIG. 7(a) shows the configuration of micro mirrors for passing an optical path 24 from the planar switch module 21 through a hole 73 formed in part of the coupler switch module 22 in the optical switch unit 41#1 of FIG. 6 or reflecting this in the vertical direction. Namely, two micro mirrors 12, that is, MEMS mirrors, capable of vertical movement are arranged in the vicinity of the hole 73 of the coupler switch module 22 while inclined by 45 degrees.

When perpendicularly reflecting light striking from the planar switch module 21, the top micro mirror 12 is moved in the bottom left direction, whereby the light from the planar switch module 21 is reflected by 90 degrees. This is shown in FIG. 7(b).

Conversely, when making light headed in the vertical direction turn to the planar switch module 21 side horizontally, the bottom micro mirror 12 is moved to the top left to reflect that light. This is shown in FIG. 7(c).

In a state where the two micro mirrors 12 are retracted, the light can pass in both of the vertical direction and the horizontal direction. This is shown in FIG. 7(d).

In this way, the light passes through the coupler switch module 22 in the optical switch unit 41#1 or can be reflected to top and bottom there.

Figure 8:
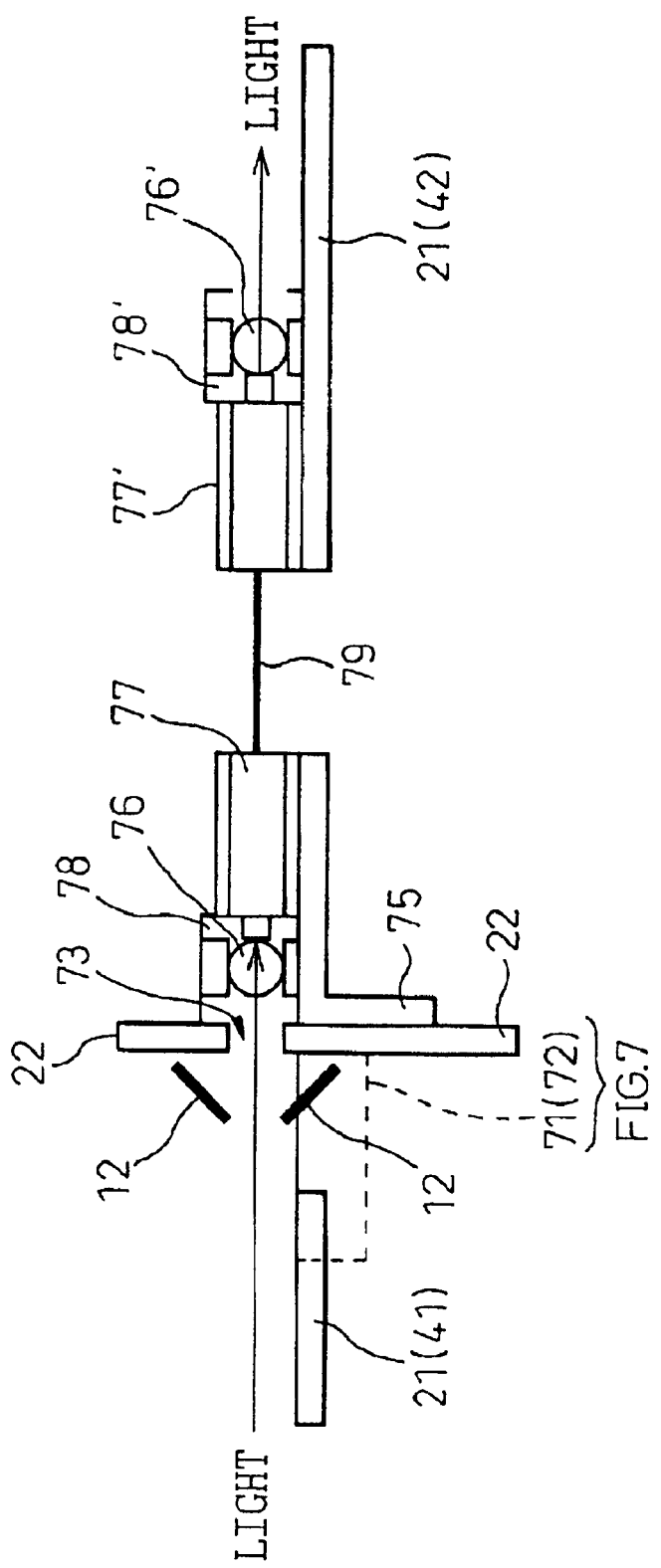
FIG. 8 is a view explaining the configuration of the second embodiment of FIG. 6 in more detail (part 2)

FIG. 8 shows details of the mechanism of the portion where the optical switch unit #1 and the optical switch unit #2 of FIG. 6 are connected. Note that, in FIG. 8, the portion shown by "FIG. 7" corresponds to the configuration of FIGS. 7(a) to 7(d).

The rear surface of the coupler switch module 22 in the optical switch unit 41(#1) (the surface on the opposite side to the surface to which the planar switch module 21 is attached) has an L-shaped support stand 75 attached to it. A housing 78 for supporting a lens 76 and an optical fiber connector 77 is fixed onto the support stand 75.

In the housing 78, a plurality (#1 to #N) of lenses 76 are arranged in one column (in the vertical direction relative to the figure). The optical fiber connector 77 equipped with an optical fiber cable 79 is inserted into this housing 78.

Similarly, a housing 78' provided with an optical fiber connector 77' and a lens 76' is attached to the coupler switch module 22 in the optical switch unit 42 (#2). By this configuration, the light passing through the coupler switch module 22 of the optical switch unit 41(#1) passes through the lens 76, passes through the optical fiber cable 79 to enter into the planar switch module 21 of the optical switch unit 42(#2), and passes through the lens 76' thereof to enter into the portion where the micro mirrors 12 are arrayed in the form of a matrix.

Figure 9:
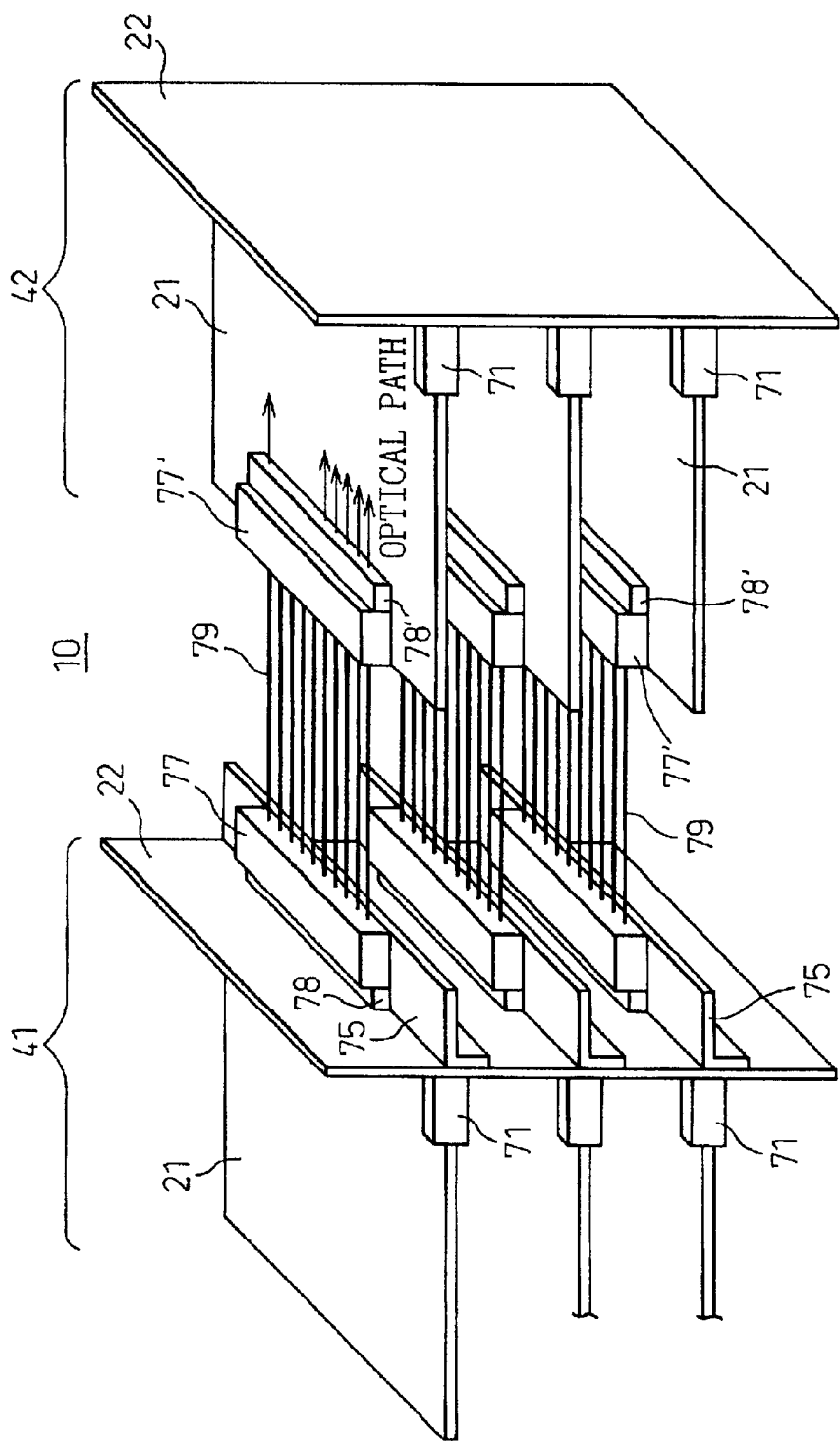
FIG. 9 is a view explaining the configuration of the second embodiment of FIG. 6 in more detail (part 3)

FIG. 9 is a view of the overall configuration of an assembly of the configurations partially explained by FIGS. 7(a) to 7(d) and FIG. 8 as above. Note that, in the figure, as the optical fiber, a configuration of single fibers was shown, but it is also possible to utilize optical fibers bundled together in the form of a ribbon.

Figure 10:
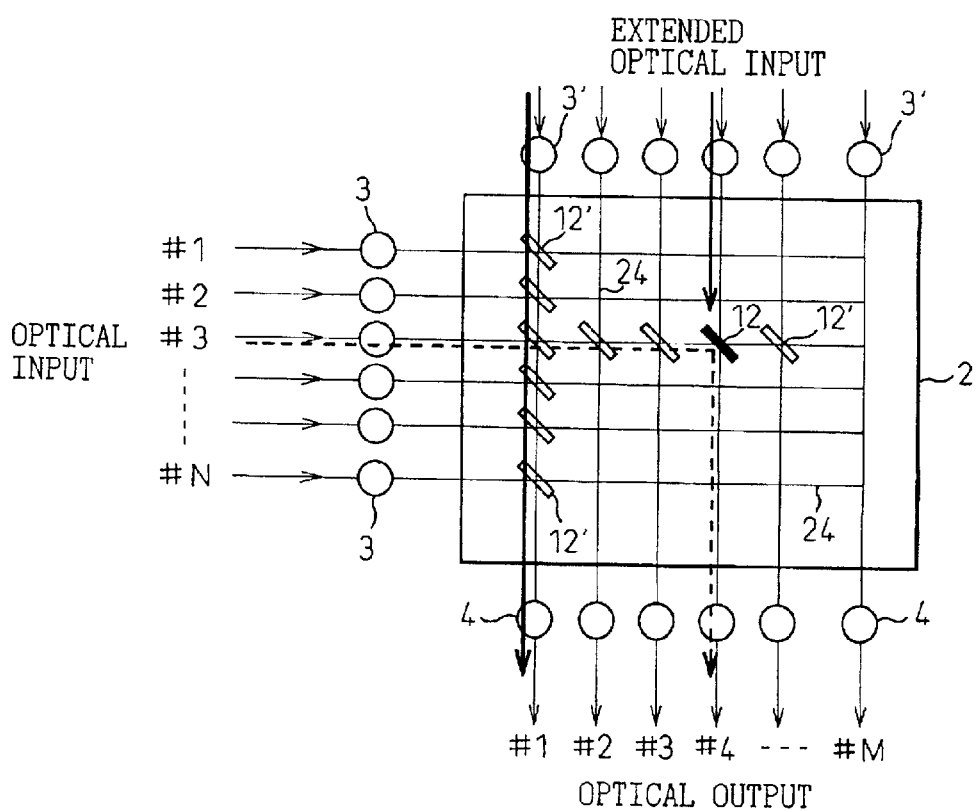
FIG. 10 is a view explaining the thinking behind an expansion optical incoming port according to the present invention.

FIG. 10 is a view explaining the thinking behind an expansion optical incoming port according to the present invention.

In the figure, reference numeral 3' is an expansion optical incoming port. Among the input optical signals from the expansion optical incoming port 3', the optical signal going toward the optical outgoing port 4#4 is blocked at the mirror (optical transmitting/reflecting element) 12 and cannot advance to the front from that. Note, here, the optical signal from the optical incoming port 3#3 is reflected at the mirror and switched to the optical outgoing port 4#4.

On the other hand, the optical signal from the expansion optical incoming port 3'#1 passes through all mirrors 12' and reaches the optical outgoing port 4#1. At this time, the optical signals from two directions intersect at the center mirror among these mirrors 12', but this does not hinder the output of light.

In this case, if the optical path 24 from the optical incoming port 3 does not have an output to the optical outgoing port 4, a state where the optical input from the expansion optical incoming port 3' is connected to the optical outgoing port 4 is exhibited. Also, if the optical path 24 from the optical incoming port 3 has an output to the optical outgoing port 4, a state where the optical input from the expansion optical incoming port 3' is blocked by the mirror 12 and not connected to the optical outgoing port 4 is exhibited.

Figure 11:
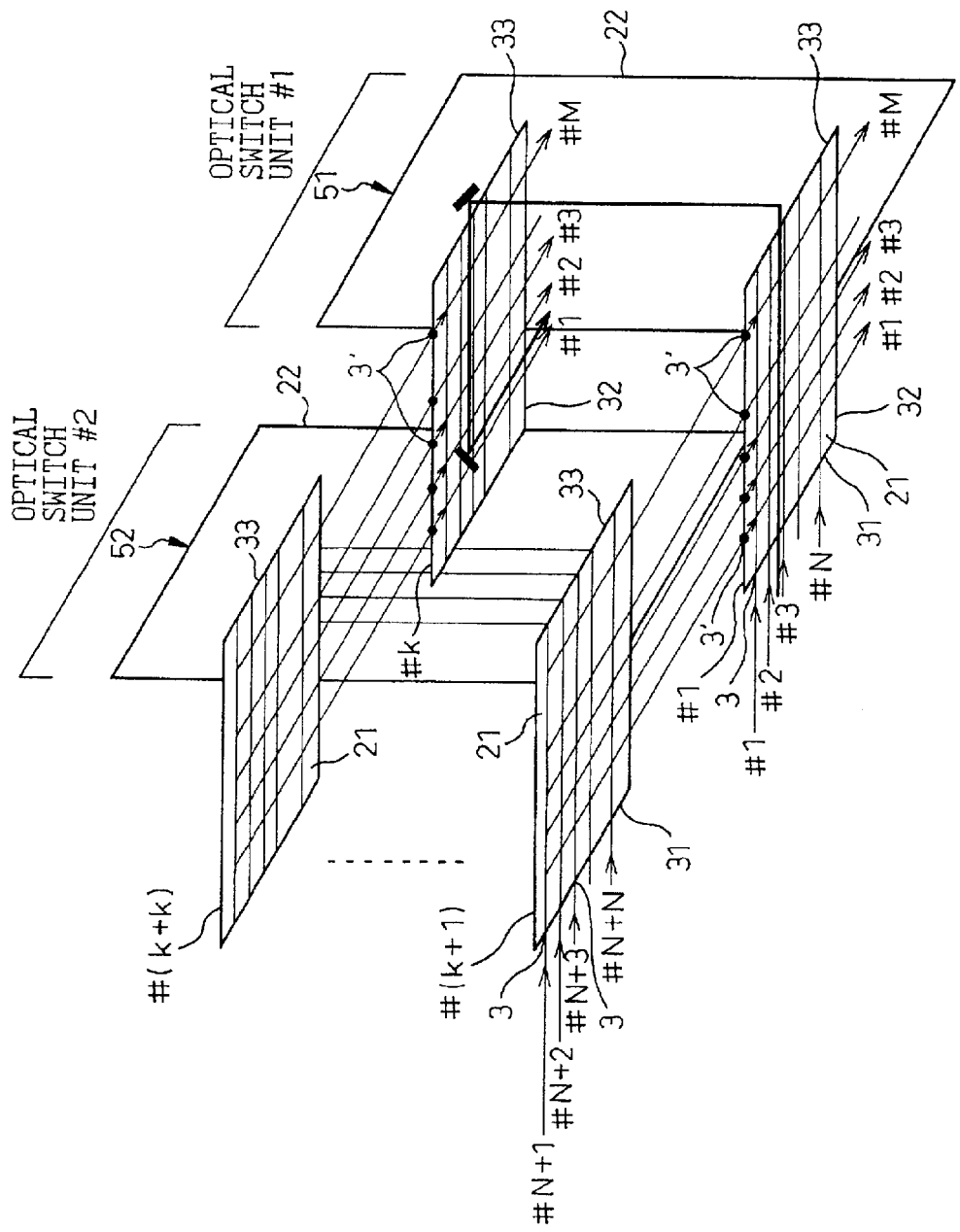
FIG. 11 is a view of a third embodiment of the present invention.

FIG. 11 is a view of a third embodiment of the present invention and shows an example of the configuration employing the thinking behind FIG. 10.

In this third embodiment, a plurality of optical incoming ports 3 are arrayed on first sides 31 of a plurality of planar switch modules 21, a plurality of optical outgoing ports 4 are arrayed on second sides 32 perpendicular and adjoining to the first sides 31 of a plurality of planar switch modules 21, and a coupler switch module 22 is arranged along each third side 33 forming an opposite side of each first side 31 and further a first optical switch unit 51 and a second optical switch unit 52 having an identical configuration to that of the first optical switch unit 51 are arranged side by side in parallel to the third side 33.

Here, the expansion incoming port is shown in the first optical switch unit 51 as 3'.

In this way, two optical switch units 51 and 52 are connected, and the switch scale [N×(M×k)] of one optical switch unit is expanded to twice the switch scale [(2×N)× (M×k)].

Figure 12:
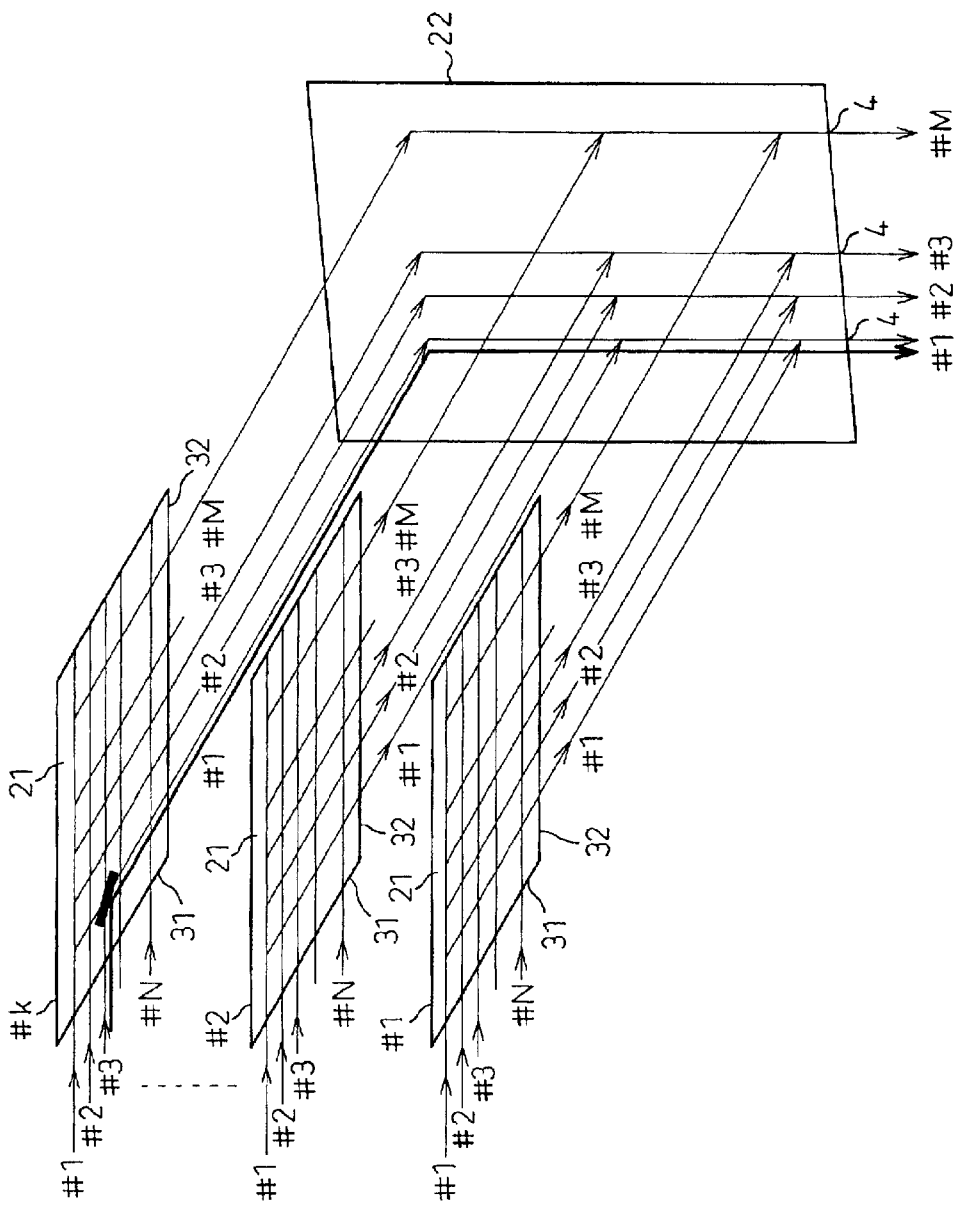
FIG. 12 is a view of a fourth embodiment of the present invention.

FIG. 12 is a view of a fourth embodiment of the present invention.

In this fourth embodiment, a plurality of optical incoming ports 3 are arrayed on first sides 31 of a plurality of planar switch modules, and the coupler switch module 22 is arranged along each second side 32 perpendicular and adjoining to each first side 31 of the plurality of planar switch modules 21. Here, a plurality of optical outgoing ports 4 are formed at one end of the coupler switch module 22.

Further explaining this according to the drawings, a plurality of planar optical switch modules 21#1 to 21#k each comprising N×M number of optical switches are coupled by a planar outgoing coupler switch module 22 (M×k number of optical switches) for spatially coupling the optical outputs as the light from the optical outgoing ports 4 of the planar optical switch modules 21. Then, (N×k)×M optical switch having (N×k) incoming ports and M outgoing ports is realized as a whole.

Here, in a planar optical switch module 21, when an optical signal is output to the outgoing port in its plane, the optical route is altered at the crosspoint in that planar optical switch module 21. In the example of FIG. 12, the light from the optical incoming port #3 of the planar optical switch module 21#k is output from the optical outgoing port #1 of the related planar optical switch module 21#k, and further the optical signal is output from the optical outgoing port #1 of the coupler switch module 22.

Figure 13:
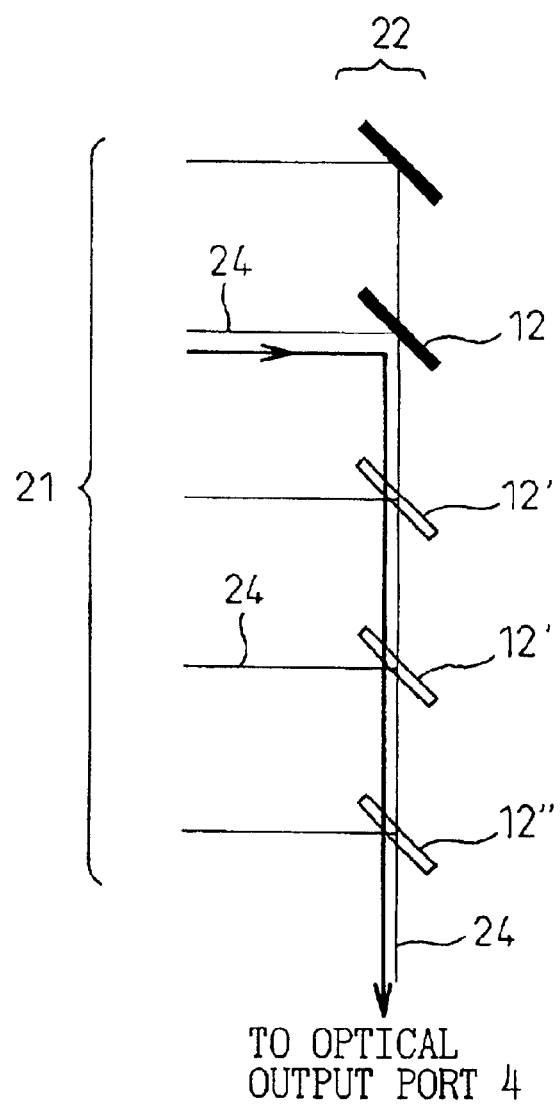
FIG. 13 is a view of an example of the configuration of a coupler switch module in FIG. 12.

FIG. 13 is a view of an example of the configuration of the coupler switch module in FIG. 12.

For the route alteration of an optical path 24 in the coupler switch module 22 shown in FIG. 12, for example total reflection by 45 degrees by the mirror 12 as shown in FIG. 13 is utilized. By the arrangement of the mirror, a change of direction by 90 degrees in the same plane or a change of direction by 90 degrees to the vertical direction is possible. On the other hand, at the mirror 12', the optical signal is completely passed.

Figure 14:
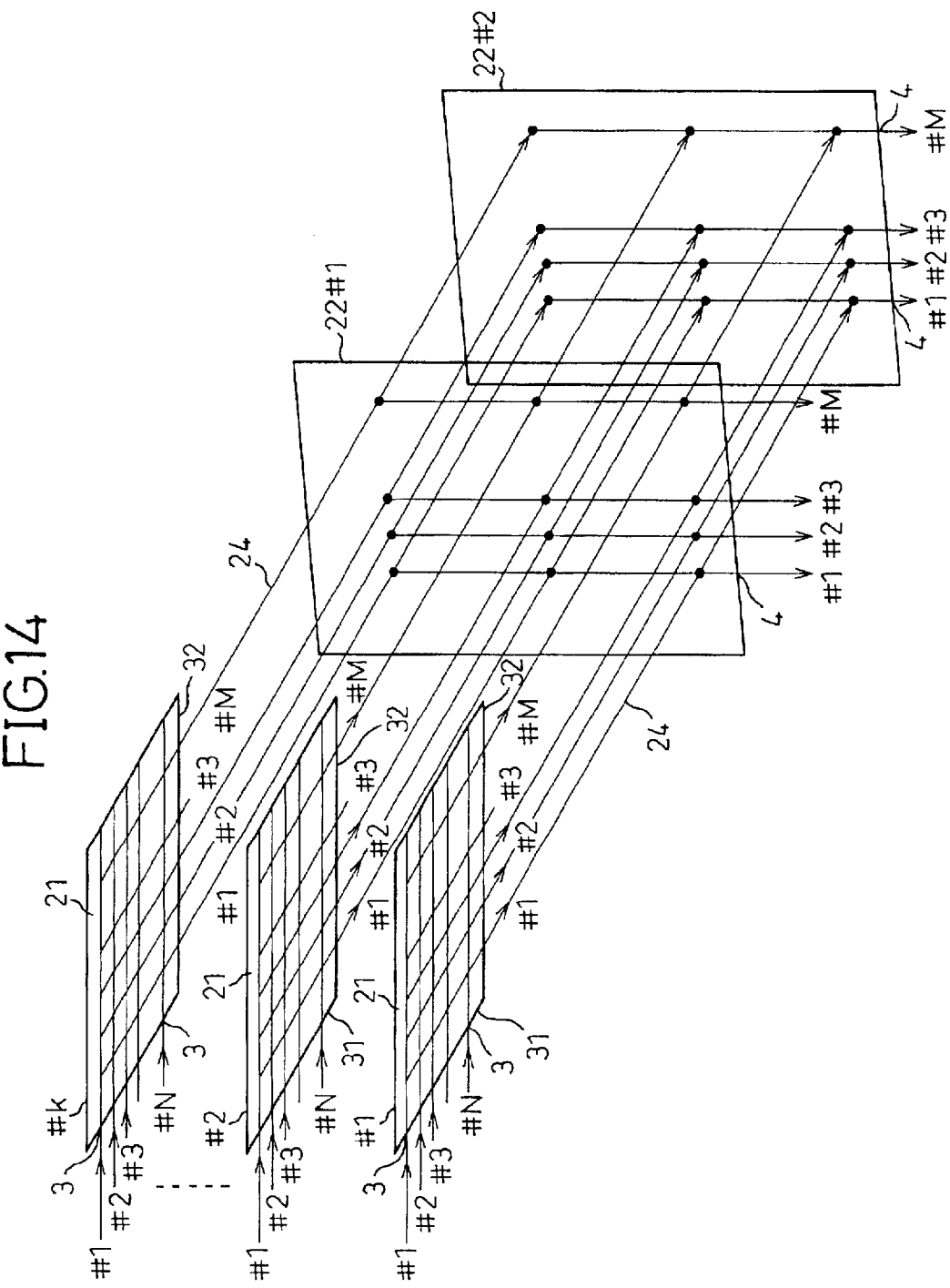
FIG. 14 is a view of a fifth embodiment of the present invention.

FIG. 14 is a view of a fifth embodiment of the present invention.

In this fifth embodiment, a plurality of optical incoming ports 3 are arrayed on first sides 31 of a plurality of planar switch modules 21. Further, a first coupler switch module 22#1 is formed arranged along second sides 32 perpendicular and adjoining to the first sides 31 of the plurality of planar switch modules 21, formed with a plurality of optical outgoing ports 4 on one side, and enabling passing of each optical path 24 therethrough. Further, a second coupler switch module 22#2 having an identical configuration to the first coupler switch module 22#1 is provided side by side with respect to the first coupler switch module 22#1. A plurality of optical outgoing ports 4 are formed on one end of the second coupler switch module 22#2.

In this way, by connecting two coupler switch modules, the switch scale [(N×k)×M] of one switch group can be expanded to the twice the switch scale [(N×k)×(M×2)].

Figure 15:
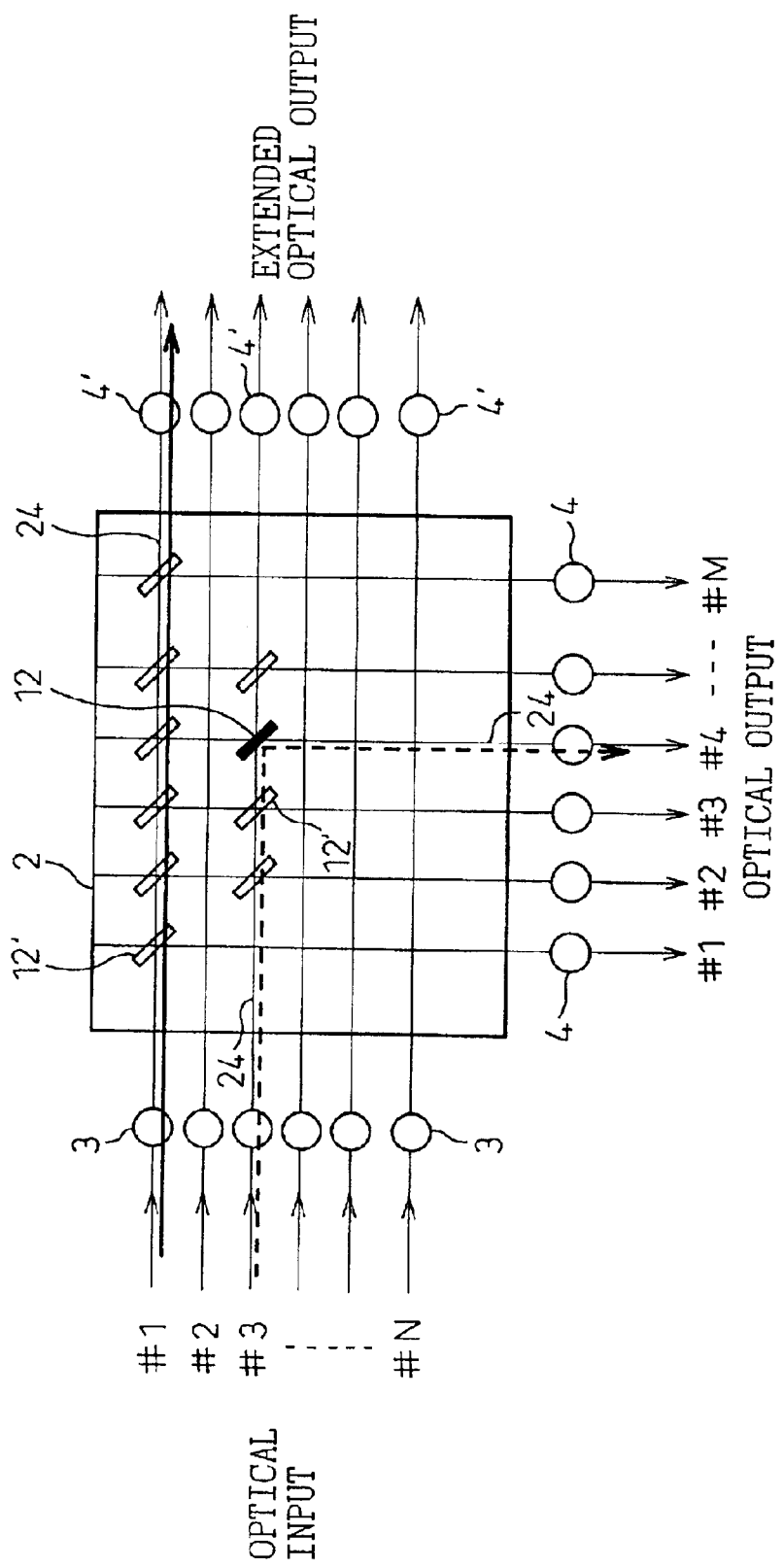
FIG. 15 is a view explaining the thinking behind an expansion optical outgoing port according to the present invention.

FIG. 15 is a view for explaining the thinking behind the expansion optical outgoing port according to the present invention.

In the figure, reference numeral 4' is the expansion optical outgoing port. Among the input optical signals from the optical incoming port 3#3, the optical signal headed toward the optical outgoing port 4#4 is blocked at the illustrated mirror (optical transmitting/reflecting element) 12 and cannot advance toward the expansion optical outgoing port 4'.

On the other hand, the optical signal from the optical incoming port 3#1 is not blocked at the mirrors 12, all of which are off, but advances to the expansion optical outgoing port 4'. In this case, when the optical path 24 from the optical incoming port 3 does not have an output to the optical outgoing port 4, a state where the optical input from the optical incoming port 3 is connected to the expansion optical outgoing port 4' is exhibited. Also, when the optical path 24 from the optical incoming port 3 has an output to the optical outgoing port 4, the optical input from the optical incoming port 3 is blocked by the mirror 12, so a state where it is not connected to the expansion optical outgoing port 4' is exhibited.

Figure 16:
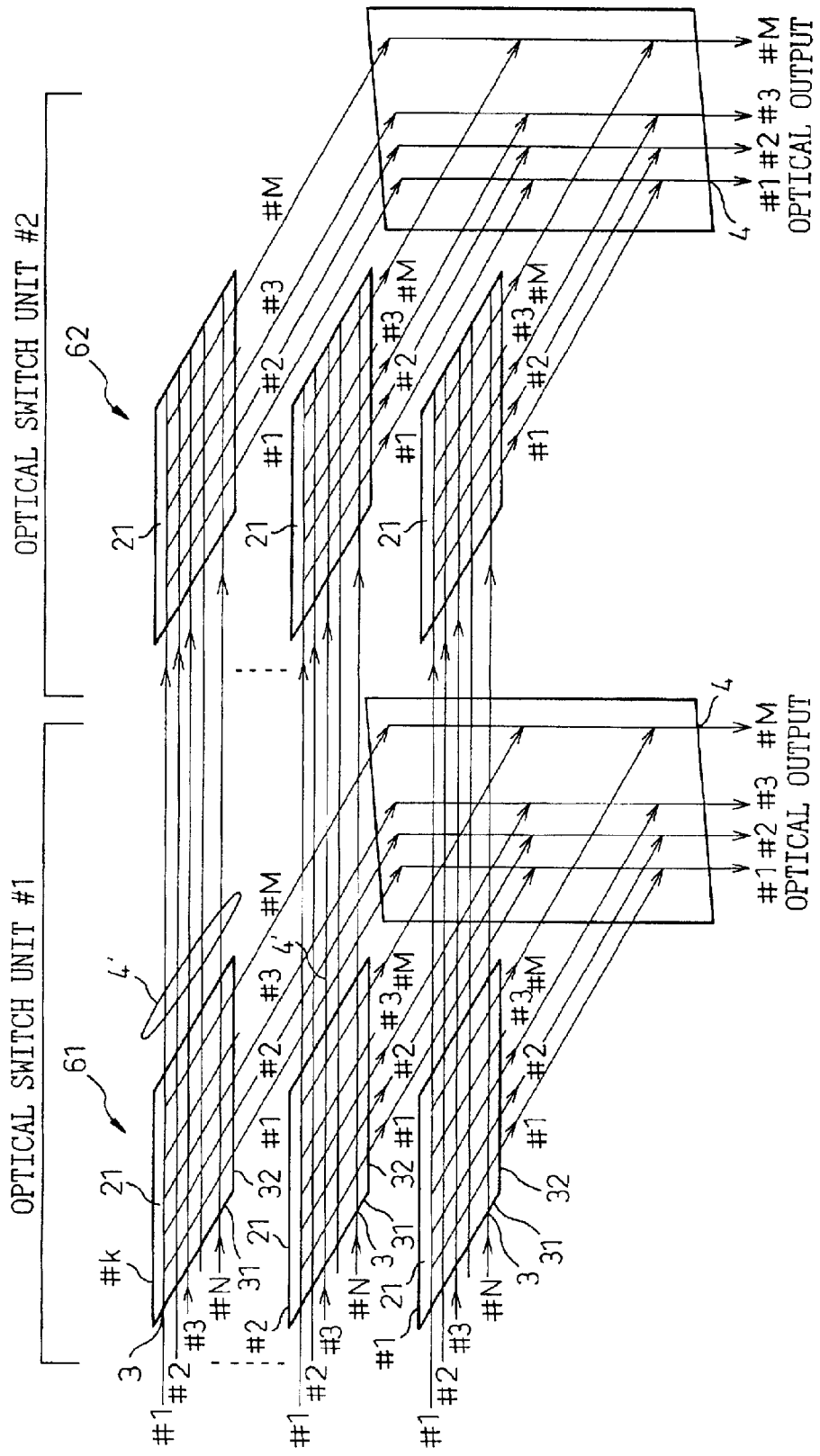
FIG. 16 is a view of a sixth embodiment of the present invention.

FIG. 16 is a view of a sixth embodiment of the present invention and shows an example of the configuration employing the thinking behind FIG. 15.

In this sixth embodiment, a plurality of optical incoming ports 3 are arrayed on the first sides 31 of a plurality of planar switch modules 21, and a coupler switch module is formed arranged along the second sides 32 perpendicular and adjoining to the first sides 31 of the plurality of planar switch modules 21 and having a plurality of optical outgoing ports 4 formed on its one end so as to form a first optical switch unit 61, and further a second optical switch unit 62 having an identical configuration to the first optical switch unit 61 is provided side by side in parallel to the second side 32.

Here, the expansion optical outgoing port is shown in the first optical switch unit 61 as 4'.

In this way, by connecting two optical switch units 61 and 62, the switch scale [(N×k)×M] of one optical switch unit is expanded to twice the switch scale [(N×k)×(M×2)].

Summarizing the effects of the invention, as explained above, according to the present invention, a plurality of planar switch modules are spatially coupled by the planar coupler switch module, and a large scale and compact optical switch device is realized by this.

Due to this, when using MEMS optical elements, the yield can be raised.

Also, by coupling a plurality of smaller optical switch modules one by one, an optical switch device having a larger scale can be realized.

Furthermore, by using the three-dimensional structure for mounting, it is possible to realize a more compact part structure of easier handling.

While the invention has been described with reference to specific embodiments chosen for purpose of illustration, it should be apparent that numerous modifications could be made thereto by those skilled in the art without departing from the basic concept and scope of the invention.

What is claimed is:

1. An optical switch device comprised of
   a plurality of planar switch modules arranged in a first direction and stacked on each other in a second direction, and
   at least one coupler switch module arranged in the second direction along each one side of said plurality of planar switch modules and selectively coupling a plurality of optical paths formed on one said planar switch module and a plurality of optical paths formed on another said planar switch module.

2. An optical switch device as set forth in claim 1, wherein
   each said planar switch module is provided with a plurality of optical transmitting/reflecting elements arrayed on its surface in the form of a matrix and capable of expanding routes of said optical paths as they are or switching the routes, and
   each said coupler switch module is provided, on the surface thereof, with a plurality of optical transmitting/reflecting elements for forming optical paths for selectively coupling said plurality of optical paths among said plurality of planar switch modules.

3. An optical switch device as set forth in claim 1, wherein said plurality of planar switch modules are comprised by k number of planar switch modules, each planar switch module has N number of optical incoming ports at most inputting optical signals corresponding to said optical paths so as to realize k×N number of incoming ports at the maximum as a whole, and each planar switch module has M number of optical outgoing ports at most outputting the optical signals from corresponding optical paths so as to realize k×M number of optical outgoing ports at the maximum as a whole.

4. An optical switch device as set forth in claim 3, wherein
   a plurality of said optical incoming ports are arrayed on first sides of the plurality of said planar switch modules,
   a plurality of said optical outgoing ports are arrayed on second sides perpendicular and adjoining to said first sides of the plurality of planar switch modules, and
   said coupler switch modules are arranged along third sides forming opposite sides relative to said first sides.

5. An optical switch device as set forth in claim 3, wherein
   a plurality of said optical incoming ports are arrayed on first sides of plurality of said planar switch modules,
   said coupler switch module is arranged along second sides perpendicular and adjoining to said first sides of the plurality of planar switch modules, and
   a plurality of said optical outgoing ports are formed on one end of the coupler switch module.

6. An optical switch device as set forth in claim 4, wherein
   a plurality of said optical incoming ports are arrayed on the first sides of plurality of said planar switch modules,
   a plurality of said optical outgoing ports are arrayed on second sides perpendicular and adjoining to said first sides of the plurality of planar switch modules,
   said coupler switch module is arranged along each third side forming the opposite side of said each first side, to thereby comprise a first optical switch unit, and
   a second optical switch unit having an identical configuration to the first optical switch unit is connected in cascade with respect to the first optical switch unit in said first direction by enabling each said optical path to pass through the coupler switch module.

7. An optical switch device as set forth in claim 4, wherein
   a plurality of said optical incoming ports are arrayed on first sides of plurality of said planar switch modules,
   a plurality of said optical outgoing ports are arrayed on second sides perpendicular and adjoining to said first sides of the plurality of planar switch modules, and
   said coupler switch module is arranged along each third side forming the opposite side of said each first side
   thereby to comprise a first optical switch unit and further
   said first optical switch unit and a second optical switch unit having an identical configuration to that of the first optical switch unit are arranged side by side in parallel to said third side.

8. An optical switch device as set forth in claim 5, wherein
   a plurality of said optical incoming ports are arrayed on first sides of a plurality of said planar switch modules,
   a first coupler switch module is formed arranged along the second sides perpendicular and adjoining to the first sides of the plurality of planar switch modules, formed with a plurality of said optical outgoing ports on one side thereof, and enabling passing of each optical path therethrough, and a second coupler switch module having an identical configuration to the first coupler switch module is provided side by side with respect to the first coupler switch module, and a plurality of said optical outgoing ports are formed on one end of the second coupler switch modules.

9. An optical switch device as set forth in claim 5, wherein a plurality of said optical incoming ports are arrayed on the first sides of plurality of said planar switch modules, a coupler switch module is formed arranged along the second sides perpendicular and adjoining to said first sides of the plurality of planar switch modules and having plurality of said optical outgoing ports formed on its one end, to thereby comprise a coupler switch module, and a second optical switch unit having an identical configuration to the first optical switch unit is provided side by side in parallel to said second side.

10. An optical switch device as set forth in claim 1, wherein said optical transmitting/reflecting element is formed by a micro electronic mechanical system (MEMS).

* * * * *